United States Patent [19]

Lehtonen

[11] Patent Number: 4,953,415

[45] Date of Patent: Sep. 4, 1990

[54] ARRANGEMENT FOR CONVERTING RECIPROCATING MOTION INTO EVEN ROTATIONAL MOTION

[75] Inventor: Kari Lehtonen, Paimio, Finland

[73] Assignee: Tunturipyora Oy, Turku, Finland

[21] Appl. No.: 389,518

[22] Filed: Aug. 4, 1989

[30] Foreign Application Priority Data

Aug. 10, 1988 [FI] Finland .................................. 883726

[51] Int. Cl.⁵ ..................... F16H 27/02; A63B 69/06; F16D 49/10
[52] U.S. Cl. .................................. 74/141; 188/77 R; 192/7; 272/72; 272/132
[58] Field of Search .......................... 272/72, 131, 132; 74/140, 141, 7; 192/7; 188/77 R

[56] References Cited

U.S. PATENT DOCUMENTS

| | | | |
|---|---|---|---|
| 633,357 | 9/1899 | Caulfield | 188/77 R X |
| 797,464 | 8/1905 | Sjastram | 188/77 R X |
| 1,782,728 | 11/1930 | Kiefer | 272/72 |
| 4,047,715 | 9/1977 | Gjessing | 272/132 |
| 4,662,525 | 5/1987 | Bottem | 188/77 R X |

FOREIGN PATENT DOCUMENTS

| | | | |
|---|---|---|---|
| 546683 | 11/1922 | France | 188/77 R |
| 2582949 | 12/1986 | France | 272/131 |
| 27232 | of 1898 | United Kingdom | 188/77 R |

Primary Examiner—Allan D. Herrmann
Attorney, Agent, or Firm—William E. Mouzavires

[57] ABSTRACT

Figure 1:
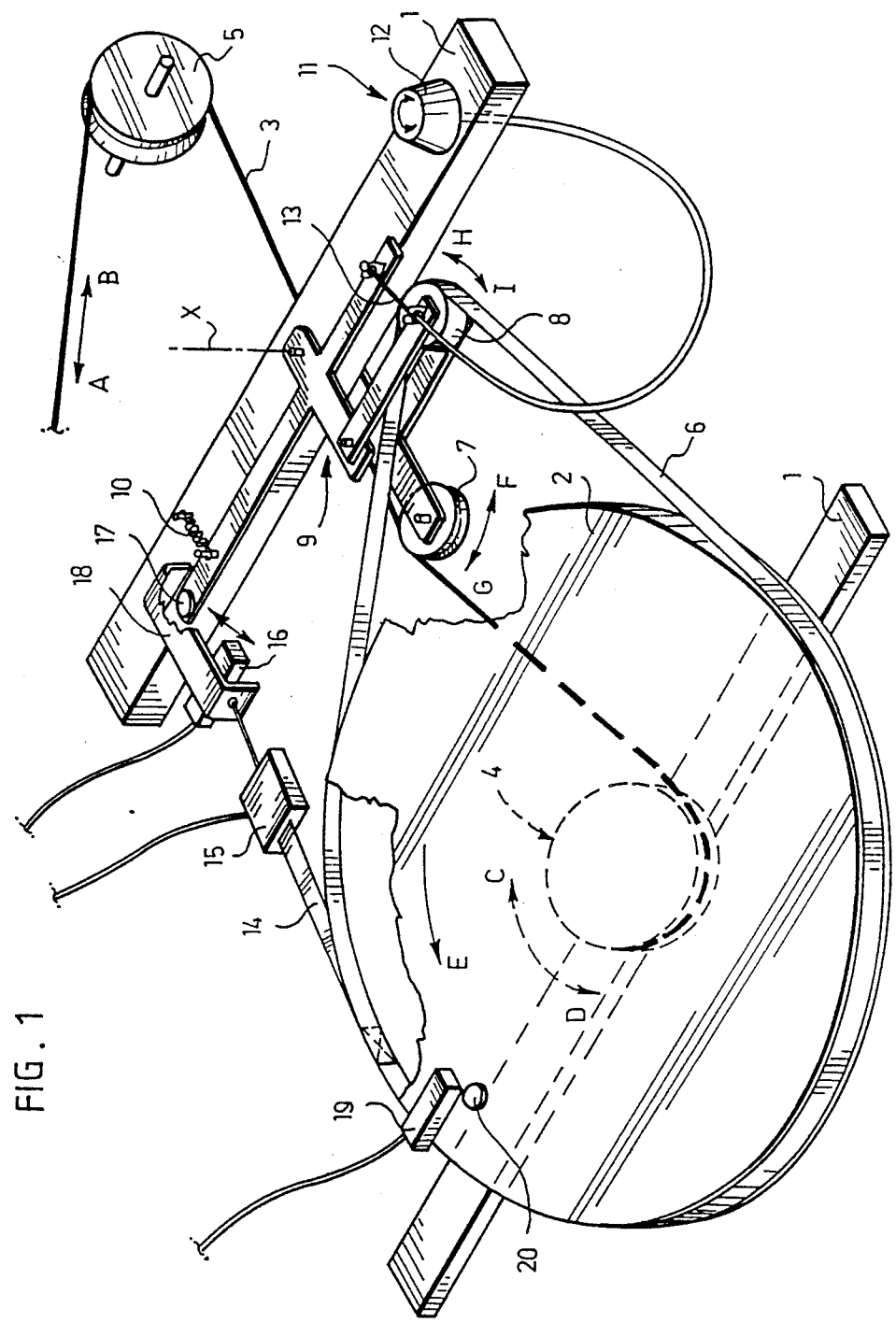

The invention relates to an arrangement for converting reciprocating motion into even rotational motion. The arrangement comprises a frame (1), a flywheel (2), a pull member (3) attached to the flywheel by means of a free gear mechanism (4), and a brake band arranged to resist the rotational motion of the flywheel (2). In order to achieve smooth operation without jerks, the arrangement comprises a relief member (7) connected to the frame by means of a lever mechanism (4). When the pull member (3) is pulled (A), it presses the relief member (7) and turns the lever mechanism so that the brake band is tightened against the flywheel. When the free gear mechanism (4) draws the pull member in direction (B), the lever mechanism (9) is arranged to turn so that it reduces the tightening force exerted by the brake band on the peripheral face of the flywheel. (FIG. 1).

6 Claims, 2 Drawing Sheets

ARRANGEMENT FOR CONVERTING RECIPROCATING MOTION INTO EVEN ROTATIONAL MOTION

The invention relates to an arrangement for converting reciprocating motion into even rotational motion, comprising a frame and a flywheel placed thereon, a pull member being attached to the flywheel by means of a free gear mechanism so as to move in a reciprocating manner and a braking band being arranged around the rim of the flywheel so as to be pressed against its peripheral surface, whereby the flywheel is arranged to rotate in a predetermined direction when the pull member is pulled and the brake band is arranged to resist the rotational motion of the flywheel.

Arrangements of this kind are today widely used in connection with various devices, including exercise devices, rowing devices in particular.

Rowing devices in which reciprocating motion is converted into even rotational motion include a device in which the flywheel is mounted in an upright position between the rails of the frame, the reciprocating rowing motion being imparted to the flywheel by means of a belt and a free gear mechanism, whereby the reciprocating motion of the belt causes the flywheel to rotate. Further, a brake band is fitted around the rim of the flywheel so as to be pressed against the peripheral surface of the flywheel for braking the rotational motion of the flywheel. One end of the brake band is attached to the frame of the device while the other end is attached to a tightening means by means of which the tightness of the band, that is, the braking resistance, can be adjusted as desired.

A drawback of the above-mentioned prior art solution is that it is complicated and has limited installation possibilities so that the practicability of the device is not the best possible. In addition, the operation of this kind of device is not equivalent to a real rowing situation, since the flywheel is often braked too violently during the return movement.

The object of the invention is to provide an arrangement by means of which the drawbacks of the prior art can be eliminated. This is achieved by means of an arrangement according to the invention which is characterized in that the arrangement comprises a relieve means connected to the brake band and to the frame by means of a lever mechanism, whereby the pull member is arranged to be pressed against the relieve means during a pulling movement and to pivot the lever mechanism so that the brake band is tightened against the flywheel, the lever mechanism being arranged to pivot so that the tightening force exerted by the brake band on the peripheral face of the flywheel is decreased when the pull member is displaced by the free gear mechanism in a direction opposite to the pulling direction.

It is essential in the invention that when the pull member is pulled, it is pressed more tightly against the relieve means, turning the lever mechanism so that it tightens the brake band more closely around the flywheel. When the pull member is not being pulled, a spring provided in the free gear mechanism draws the slackened pull member in a direction opposite to the pulling direction, and the tightening force exerted by the brake band turns the lever mechanism and the relieve means so that the tightening force exerted by the braking band on the rim of the flywheel is decreased.

An advantage of the arrangement according to the invention is that it is simple with resultant low manufacturing and maintenance cost. A further advantage is that the operation of the arrangement in a rowing device, for instance, is very similar to rowing with a real boat, that is, the rowing is smooth without jerks. This is due to the fact that, similarly as in a real rowing situation, the braking effect exerted on the flywheel is different during the pulling movement and the return movement.

Figure 2:
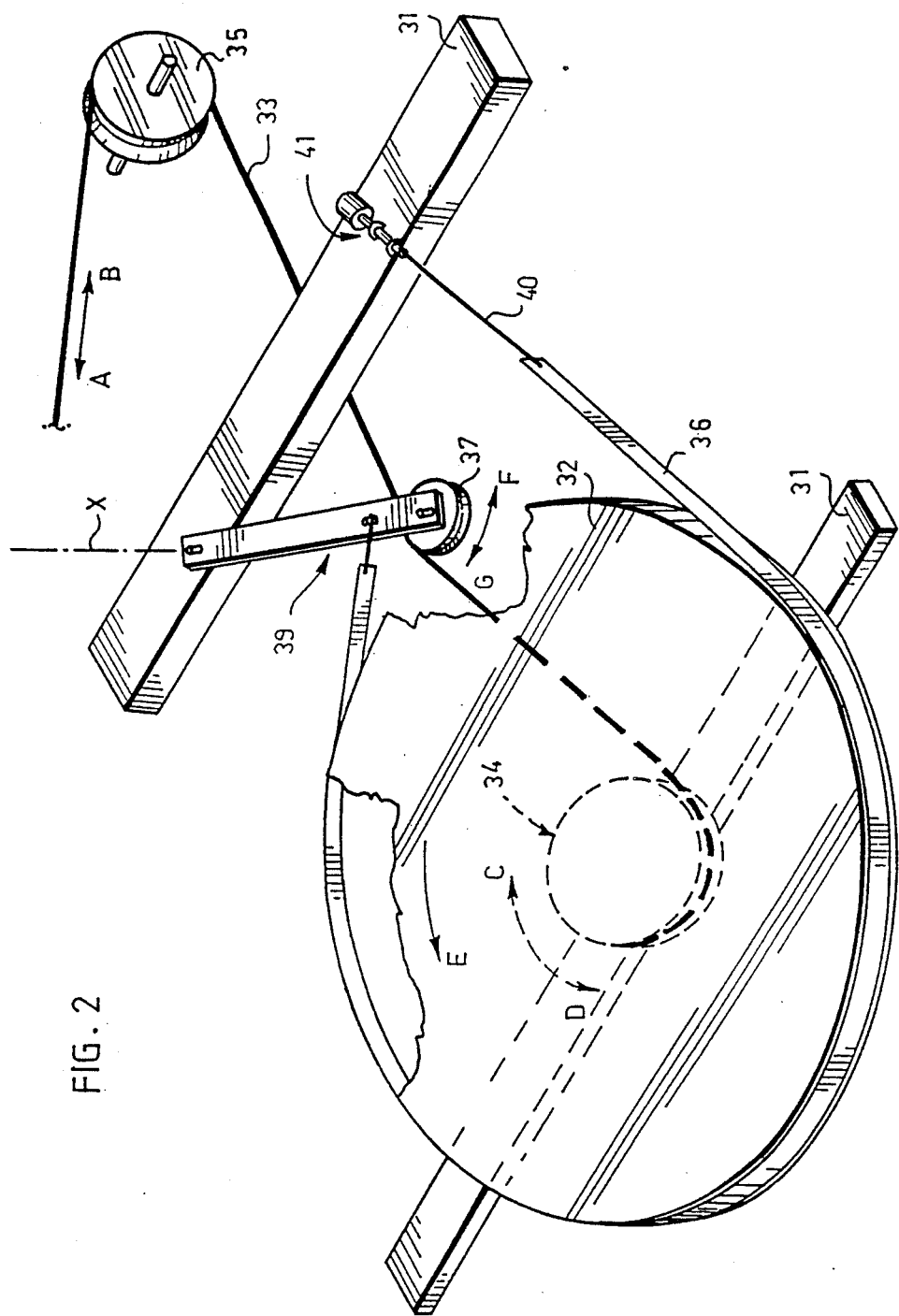

In the following the invention will be described by means of the embodiments shown in the attached drawing, whereby FIG. 1 shows an embodiment of the invention provide measuring units; and FIG. 2 shows a simpler embodiment of the invention.

In the example of FIG. 1, the reference numeral 1 indicates a frame on which a flywheel 2 is mounted for rotation. In the figure, the reference numeral 3 indicates a pull member, e.g., a belt.

The pull member 3 is connected to the flywheel by means of a free gear mechanism 4. In addition to the free gear, the free gear mechanism 4 comprises a pulley and a return spring. The reference numeral 5 indicates a sheave by means of which the direction of the pull member 3 can be adjusted.

In FIG. 1, the reference numeral 6 indicates a brake band arranged in the form of an endless loop. The brake band 6 is arranged to be pressed against the peripheral surface of the flywheel 2. A relieve means 7 and an adjusting means 8, which can be formed by pulleys, for instance, are disposed within the loop formed by the brake band 6. The relieve means 7 and the adjusting means 8 are connected to each other and to the frame by means of a lever mechanism 9.

The pull member 3 is arranged to pass via the relieve means 7 in such a manner that it bends at said means. The lever mechanism 9 is attached to the frame 1 so as to be entirely pivotable on an axis X. Further, the lever mechanism 9 is provided with a spring element 10 tending to pivot the mechanism on the axis X. One end of the spring element 10 is attached to the frame 1 and the other end to the lever mechanism 9.

In principle, the arrangement operates in the following way. When the rower pulls the pull member 3 in direction A, the pull member 3 makes the pulley of the free gear mechanism 4 rotate in direction D and the flywheel in direction E through the free gear. Since the pull member 3 forms a bend at the relieve means 7, it tends to get as straight as possible between the sheave 5 and the pulley 4 when pulled in direction A, thus tending to displace the relieve means 7 in direction F. Since the relieve means 7 is fitted in the lever mechanism 9, which is attached to the frame 1 so that the entire lever mechanism is pivotable on the axis X, a pull at the pull member in direction A causes the relieve means 7 and the entire lever mechanism to be displaced in direction F. As the entire lever mechanism pivots on the axis X, the adjusting means 8 is displaced in direction H. When displaced in direction H, the adjusting means 8 is pressed more closely against the inside of the brake band, simultaneously drawing the brake band 6 into a closer contact with the peripheral surface of the flywheel 2 for braking its rotation.

When the rower performs the return movement, the return spring of the free gear mechanism 4 turns the pulley of the free gear mechanism in direction C and the pull member in direction B. Due to the free gear provided between the pulley of the free gear mechanism 4 and the flywheel 2, the flywheel does not tend to reverse its direction of rotation, but keeps rotating in direction E under the influence of the mass force. If the brake band should be pressed against the peripheral surface of the flywheel with a force equivalent to that applied when pulling the pull member in direction A, the brake band 6 would in any case stop the movement of the flywheel relatively rapidly. The braking effect exerted by the brake band 6 is decreased during the return movement by means of the relieve means 7, the adjusting means 8, and the lever mechanism 9.

When the rower allows the pull member to run in direction B, the pull member is wound onto the pulley of the free gear mechanism, as mentioned above. The brake band 6 tends to get slack, and since no force is exerted on the relieve means 7, the lever mechanism 9 is able to pivot on the axis X so that the relieve means 7 is displaced in direction G and the adjusting means in direction I. Thereby the brake band 6 gets slack, and the flywheel 2 keeps rotating without any braking effect. The next pulling movement increases the rate of rotation of the flywheel, etc. So the brake operates only during the pulling movement so that the flywheel has not time enough to stop before the next pulling movement. The rowing is equivalent to rowing with a real boat, i.e. smooth and without jerks.

The braking resistance can be varied by means of an adjusting mechanism 11. In the example of the figure, the adjustment is carried out by turning an adjustment knob 12, whereby the movement of a wire rope 13 displaces the adjusting means 8 in a desired direction H or I, depending on whether the brake band 6 is to be tightened or slackened. In place of the wire rope mechanism, it is possible to use other suitable adjusting mechanisms, such as a screw and nut adjuster or the like.

The magnitude of the braking force can be measured in the following way, for instance. A separate band portion 14 is attached to the brake band 6. One end of the band portion 14 is attached to the brake band by stitching, for instance. A dynamometer unit 15 is attached to the free end of the band portion, and the dynamometer unit, in turn, is attached to the frame 1. The braking force always acts on the band portion 14 tangentially. The tighter the brake band, the more the flywheel 2 tends to turn the brake band in direction E during its rotation and the greater is the tensile stress exerted on the band portion 14 connected to the dynamometer unit 15. At the dynamometer unit, the tensile stress is converted into suitable electric current which is applied e.g. to an indicator displaying the information as a force value, torque, efficiency, energy, etc. The dynamometer unit can be formed by a strain gauge transducer, for instance.

In order to count the number of pulling movement performed by means of the arrangement, such as the number of pulls performed by means of a rowing device, a detector 16, 17 can be provided in connection with the lever mechanism. The detector counts the number of the pivoting movements of the lever mechanism 9. The detector is formed, e.g., by a magnet 17 positioned at the end of the lever, and a detector element 16 connected to the frame. The detector element 16 can be positioned within a part 18 which also limits the movement of the lever in the pulling direction of the spring element 10. The spring element 10 ensures that the lever is returned accurately.

In order to measure the rate of rotation of the flywheel 2, the arrangement can be provided with a measuring device 19, 20. The measuring device can be formed e.g. by a detector gauge 19 and a magnet 20 attached to the flywheel 2. The measuring devices operates in such a manner that the magnet 20 attached to the flywheel sends an impulse to the detector gauge 19 whenever it goes past the gauge, that is, one impulse per each revolution. The impulses are applied to a counter which determines the rate of rotation.

FIG. 2 shows a simpler embodiment of the invention. The reference numeral 31 indicates a frame on which a flywheel 32 is mounted for rotation. The reference numeral 33 indicates a pull member, such as a belt.

The pull member 33 is connected to the flywheel by means of a free gear mechanism 34 similarly as above in the embodiment of FIG. 1. The reference numeral 35 in FIG. 2 indicates a sheave by means of which the direction of movement of the pull member 33 can be adjusted as desired.

In FIG. 2, the reference numeral 36 indicates a brake band, in this particular embodiment a conventional brake band fixed at the ends. A relieve means 37, e.g., a pulley, is positioned within the loop formed by the brake band 36. The relieve means 37 is connected to the frame 31 by means of a lever mechanism 39.

One end of the brake band is attached to the lever mechanism and the other end to the frame 31. The brake band 36 can be attached to the frame e.g. by means of an adjusting wire rope 40 and an adjusting mechanism 41.

In this embodiment, too, the relieve means 37 is placed so that the pull member 33 bends at the relieve means, tending to get as straight as possible when the rower pulls at it.

In principle, the arrangement of FIG. 2 operates similarly as that of FIG. 1. When the rower pulls at the pull member in direction A, the flywheel starts to rotate in direction E. The lever mechanism 39 is attached pivotably to the frame, being pivotable on an axis X. A movement of the pull member in direction A causes the lever mechanism to be pivoted in direction F, so that the brake band 36 is pressed more closely against the flywheel, thus braking its rotation. Accordingly, the pivoting of the lever mechanism results from the tendency of the pull member to get straight when the rower pulls at it, as already mentioned above.

When the rower performs the return movement, the free gear mechanism rotates the pulley in direction C and draws the pull member in direction B. The flywheel thereby still rotates in direction E, as mentioned above in connection with FIG. 1. The brake band thereby tends to get slack and since no force acts on the relieve means, the lever mechanism 39 is able to pivot on the axis X in direction G, whereby the flywheel keeps rotating without any braking effect. The next pulling movement increases the rate of rotation of the flywheel, etc.

The above embodiment is by no means intended to restrict the invention, but the invention can be modified within the scope of the claims and simplified in many ways. Accordingly, it is to be understood that the arrangement according to the invention or its parts need not necessarily be exactly similar to those shown in the figures, but other solutions are possible as well. The lever mechanism need not be similar to that shown in the figures, but the number, shape, design and size of its components may vary. The pivot points and the joints between the parts may also be effected in various ways. The spring member may be of different kind and positioned at a place different from that shown in the figures, or it may be omitted. The relieve means and the adjusting means need not necessarily be wheels as in the figures, but it is likewise possible to use e.g. slide faces. The brake band need not form a loop, as above, but its one end may be attached to the lever system and the other end, e.g., to the adjusting wire rope. The adjusting means 8 is thereby not needed, but the principle of FIG. 2, for instance, can be applied. In place of magnetically operated devices, devices such as microswitches, photocells, etc, can be used. Various measuring devices can be provided in the embodiment of FIG. 2, too. The sheave shown in the figures can be omitted if desired; on the other hand, several sheaves can be used. The pull member may be a round belt, cord, flat belt, chain, etc. The brake band can be of any shape and size and can be made of any material. Similarly, the flywheel can be made of any material and it can be of any shape and size. The measuring devices described above, that is, those measuring the rate of rotation, the force and the number of pulls, can also be omitted. Even though the above example has been described as forming part of a rowing device, it is obvious that the invention is not restricted to a rowing device but the arrangement is applicable in all devices in which reciprocating motion is to be converted into rotational motion as even as possible.

I claim:

1. An arrangement for converting reciprocating motion into even rotational motion, comprising a frame (1, 31) and a flywheel (2, 32) placed thereon, a pull member (3, 33) being attached to the flywheel by means of a free gear mechanism (4, 34) so as to move in a reciprocating manner and a braking band being arranged around the flywheel (2, 32) so as to be pressed against its peripheral surface, whereby the flywheel (2, 32) is arranged to rotate in a predetermined direction when the pull member is pulled and the brake band is arranged to resist the rotational motion of the flywheel, characterized in that the arrangement comprises a relieve means (7, 37) connected to the brake band (6, 36) and to the frame (1, 31) by means of a lever mechanism (9, 39), whereby the pull member (3, 33) is arranged to be pressed against the relieve means (7, 37) during a pulling movement along a direction (A) and to pivot the lever mechanism (9, 39) so that the brake band is tightened against the flywheel (2, 32), the lever mechanism (9, 39) being arranged to pivot so that tightening force exerted by the brake band (6, 36) on the peripheral surface of the flywheel (2, 32) is decreased when the pull member is displaced by the free gear mechanism (4, 34) in a direction (B) opposite to the pulling direction, and a detector (16, 17) connected to the lever mechanism (9, 39) for detecting a number of pivoting movements of the lever mechanism (9, 39).

2. An arrangement according to claim 1, characterized in that the relieve means (7, 37) is a wheel mounted on the lever mechanism (9, 39).

3. An arrangement according to claim 1 further including a separate band portion (14) attached to the brake band (6), and a dynamometer unit (15) for measuring tightness of the band (6) attached to the separate band portion (14).

4. An arrangement according to claim 1, characterized in that the detector (16, 17) comprises a magnet attached to the lever mechanism.

5. An arrangement according to claim 1, characterized in that tightness of the brake band can be adjusted by means of an adjusting mechanism (11, 41).

6. An arrangement according to claim 5, characterized in that the adjusting mechanism (11, 41) comprises an adjusting wire rope (13, 40).

* * * * *